United States Patent [19]

Kutaragi

[11] Patent Number: 4,622,602
[45] Date of Patent: Nov. 11, 1986

[54] SYSTEM FOR RECORDING AND/OR REPRODUCING DIGITAL DATA

[75] Inventor: Ken Kutaragi, Kanagawa, Japan

[73] Assignee: Sony Corporation, Tokyo, Japan

[21] Appl. No.: 735,187

[22] Filed: May 17, 1985

[30] Foreign Application Priority Data

May 31, 1984 [JP] Japan ................. 59-111709

[51] Int. Cl.⁴ ............................................ G11B 5/09
[52] U.S. Cl. ........................................ 360/48; 360/49
[58] Field of Search ............................ 360/39, 48, 49;
364/200, 900; 371/2, 40

[56] References Cited

U.S. PATENT DOCUMENTS 4,454,595 6/1984 Cage ................................. 364/900
4,494,157 1/1985 Ina et al. ........................ 360/49 X

OTHER PUBLICATIONS

Handbook of Microcomputer Interfacing; Steve Leibson Tab Books Inc., pp. 241-246, 1983.

Primary Examiner—Raymond F. Cardillo
Assistant Examiner—Alyssa H. Bowler
Attorney, Agent, or Firm—Lewis H. Eslinger; Alvin Sinderbrand

[57] ABSTRACT

A system for recording and/or reproducing digital data on a magnetic floppy disk, in which the address data of the digital data is nonsuccessive relative to an original time sequence thereof by the addition of error correction bits to the digital data, involves re-arrangement of the digital data by providing a buffer memory between the floppy disk apparatus and a peripheral device, the buffer memory having a capacity capable of completing the re-arrangement of the digital data, and includes allocating the digital data to the buffer memory such that pure data and the error correction bits are respectively stored in different memory areas of the buffer memory. Address data is converted upon writing or reading the digital data from the buffer memory so as to allocate the address data such that it appears to be nonsuccessive, as seen from a recorded pattern of the disk, but it appears to be successive, as seen from the peripheral device.

10 Claims, 8 Drawing Figures

SYSTEM FOR RECORDING AND/OR REPRODUCING DIGITAL DATA

BACKGROUND OF THE INVENTION

1. Field of the Invention

This invention relates generally to a system for recording and/or reproducing digital data and, more particularly, to a system wherein a floppy disk, as employed for use in an electronic still camera, is used to store digital data for other purposes, for example, for a computer.

2. Description of the Background

The presently well-known and widely used 8-inch, or 5.25-inch, magnetic, floppy disk has a standardized format and almost all of the presently known disk drive systems operate under such standardized format. As a result, it is very difficult to employ the most up to date and emerging technologies to realize higher density recording and/or reproduction with the standardized systems. Furthermore, because the rotation speed of a magnetic disk employed in the known floppy disk system is usually either 300 rpm or 600 rpm, it is essentially impossible to record and/or reproduce an analog video signal in real time. If the video signal is digitized it can be recorded and/or reproduced in real time, however, one floppy disk is capable of at best recording the information of only one still video frame on a standard 8-inch or 5.25-inch disk. In addition to requiring an analog-to-digital (A/D) converter and a complimentary digital-to-analog (D/A) converter to record and reproduce the video information digitally a digital video system also requires a frame memory. Therefore, the total digital floppy disk system becomes expensive and physically large and unwieldy. Accordingly, it is not practical to use the presently known floppy disk system to record and/or reproduce a video signal.

An electronic still camera conference in Japan has proposed the use of a 2-inch floppy disk as the recording medium for all electronic still cameras. Such 2-inch floppy disk generally resembles the presently known floppy discs but is 47 mm in diameter, 40 μm in thickness, and it has a center core element by which is may be engaged with a suitable drive mechanism. A rotational position detection element is also affixed to the center core. The 2-inch floppy disk resides within a jacket having a central opening to expose the center core element and a slideable opening so that the disk may be brought into operative contact with a magnetic head. When the disk is not in use, the slideable opening has a cover or shutter which is dust-proof and seals the disk from adverse environmental effects. A counter dial is provided to indicate the number of exposures on the disk, and a tab is provided that may be broken out to prevent inadvertent re-recording.

The data format of the proposed 2-inch disk has been preliminarily agreed upon as comprising fifty tracks, with each track with being 60 μm in width, having a guard band between adjacent tracks of 40 μm. The disk is proposed to be rotated at 3600 rpm, which represents the field frequency, and a video color signal of one field is to be recorded in each track of the magnetic disk. Thus, the proposed standardized floppy disk can be used to record fifty still color video signals. Nevertheless, although such 2-inch diameter floppy disk has been standardized to record and/or reproduce analog color video signals, it cannot easily accommodate other digital data. For example, if some other kind of digital data is converted to a quasi-video signal and then recorded on the floppy disk, such as might be done by an audio pulse code modulation (PCM) processor employed in a video tape recorder (VTR), the floppy disk will have a small memory capacity relative to the original digital data. Moreover, other problems arise, such as data compatibility, in using such disks with the existing 8-inch or 5.25-inch floppy disk systems.

When the digital data is recorded on or reproduced from this 2-inch still video camera floppy disk, it is done so in keeping with the format generally known for use in other floppy disk systems. Accordingly, when the 2-inch floppy disk is viewed from the standpoint of the video signal, it appears as having a very high recording density, whereas when viewed from the standpoint of the digital data there is a low recording density and, thus, the floppy disk is not being fully utilized.

If the video signal and the digital data were to be recorded and/or reproduced from a single floppy disk in an intermixed condition, because the signals are largely located in different bands and have different characteristics, it becomes difficult to record and/or reproduce such intermixed video signals and digital data with optimum conditions. This is due in part to the electromagnetic transducer characteristics involved, head-disc contact conditions, and so on. Furthermore, when the video signal and the digital data are recorded and/or reproduced in an intermixed state, the drive unit employed for rotating the floppy disk must rotate the disk at 300 rpm (or 600 rpm), in the case of digital data, and must also rotate the disk at 3600 rpm, in the case of the video signal. Thus, when the revolution speed of the floppy disk is selectively changed other problems arise because the floppy disk is unavailable for access for several seconds, while the servo is being stabilized. Also, requiring two motor speeds further increases manufacturing costs.

One format that could be used to record and/or reproduce video information and digital data on a floppy disk would divide the tracks on the disk into four intervals called BLOCKS, each having approximately a 90° sector. Each block could then contain an index portion and a series of data frames that would contain both the information to be recorded and some manner of error correcting code, such as a parity code or the like. Also, it is required that the digital sum variation (DSV) must be small, the ratio between the minimum length between transitions ($T_{min}$) and the maximum length between transitions ($T_{max}$) must be small, and the window margin must be made large. In order to accomplish this then an up-code conversion is required, such as the eight-to-ten conversion with $T_{max}=4T$. In this way, by following such specific encoding and data organization a 2-inch floppy disk can be made to have a large capacity, in spite of its relatively small size.

In the use of presently known floppy disks, the data transfer between the disk and the peripheral devices employed in the system is typically carried out directly at a speed that is determined by the speed of rotation of the disk, without requiring the use of a buffer memory between the disk output and the peripheral device. Also, data is allocated on the the floppy disk so that data is written in or read out from the disk at a sector unit such that the address data is consecutive. That is, the time sequence of data recorded on the floppy disk is continuous relative to the original time sequence. Nevertheless, when employing a floppy disk as proposed hereinabove, a higher transfer speed is required because the digital magnetic recording density is higher. Also, because redundant bits are added to the data for error correction and because the data is frequently rearranged by interleaving in order to correct burst errors, the time sequence of the resultant data is not in correspondence with the original time sequence on the disk. Accordingly, the floppy disk cannot be connected with the peripheral device due to this lack of consecutive time sequence. Thus, it is necessary to interpose a buffer memory between the disk and the peripheral device, however, if the data allocation on the recorded pattern of the disk is written or read out from the buffer memory as it is, the logical data addresses as viewed from the peripheral device will still not be seen to be continuous. Accordingly, when data is to be transferred in a direct memory access (DMA) mode in order to transfer data at high speed, because the data must be transferred with its addresses being consecutive, the addresses will not be matched with the buffer memory and high speed data transfer cannot be obtained.

One approach to overcoming this above-described short-coming would be that upon recording after the addition of the parity data, and during reproduction after error correction the data within the buffer memory would be rearranged, so that data which is stored in the buffer memory has its addresses consecutively arranged in the original time sequence. Nevertheless, this involves substantial additional memory capacity, as well as the requirement for the conversion time necessary to rearrange the data, all of which are not desirable.

OBJECTS OF THE SUMMARY OF THE INVENTION

Accordingly, it is an object of the present invention to provide apparatus to record digital data on a floppy disk, which can eliminate the above-noted defects inherent in known systems.

Another object of this invention is to provide an apparatus for recording digital information data on a floppy disk by employing a specific data format and a specially arranged buffer memory.

In accordance with an aspect of the present invention, a floppy disk system is provided in which data allocation in a buffer memory is arranged such that only information data and redundant bits for error correction are respectively stored indifferent areas and the address of such data is allocated within the buffer memory such that the addresses become nonsuccessive as seen from the recorded pattern of the disk, but consecutive or successive, as viewed from the peripheral devices attached to the system. Accordingly, in keeping with the present invention, it is not necessary to carry out address conversion after error correction, and the data can be transferred in a direct access memory mode by using the consecutive addresses, as viewed from outside the disk.

The above and other objects, features, and advantages of the present invention will become apparent from the following detailed description of illustrative embodiments thereof, to be read in conjunction with the accompanying drawings.

DETAILED DESCRIPTION OF PREFERRED EMBODIMENTS

Figure 1:
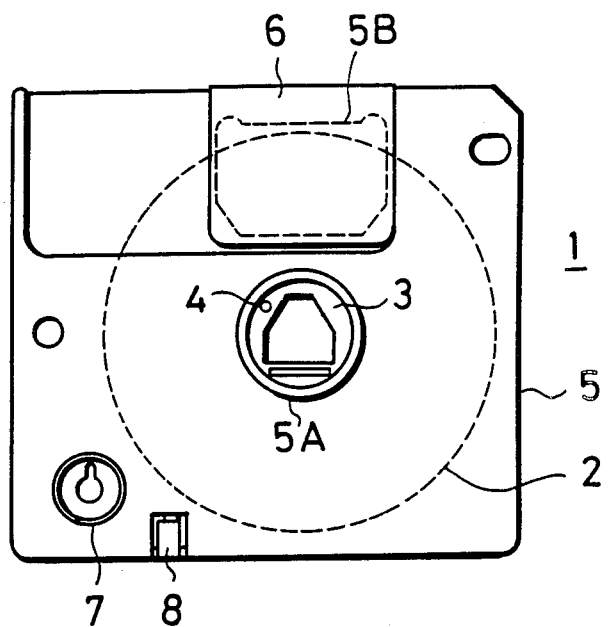
FIG. 1 is an elevational view of a floppy disk showing the mechanical features thereof.

FIG. 1 is an elevational view of a typical 2-inch floppy disk assembly 1, as might be employed with an electronic still camera. A thin magnetic disk 2 is the magnetic record medium and the disk is typically formed having a diameter of 47 mm and a thickness of 40 $\mu$m and is formed at its center with a center core element 3 that engages the spindle of the rotary drive mechanism (not shown). Center core 3 includes a rotary position indicator, such as a magnetic element 4, whose position may be easily sensed when magnetic disk 2 rotates by engagement of the center core 3 with the rotary drive mechanism.

Magnetic disk 2 resides within a jacket 5 that typically has dimensions of 60×54×3.6 mm and retains magnetic disk 2, so that it is freely rotatable therein. An opening 5A centrally located relative to disk 2, is formed in jacket 5 so that the center core element 3 can engage the rotary drive mechanism and another opening 5B is provided through which a suitable magnetic head (not shown) may come into contact with magnetic disk 2 for reading and/or reproducing. A dust-proof shutter 6 is slideably arranged on one marginal side of jacket 5, so that when disk assembly 1 is not in use opening 5B can be closed by shutter 6. A counter dial 7 is provided to indicate the number of pictures taken by the still camera, and a tab 8 is provided in jacket 5 that may be broken out and its absence sensed in order to prevent accidental re-recording of the disk, thereby destroying any pictures desired to be retained. If the tab 8 is not removed, then the disk can be repeatedly used with the previous pictures being successively erased upon re-recording.

Magnetic disk 2 is intended to accommodate fifty magnetic tracks concentrically arranged on a surface thereof, with the outermost track being denoted the first track and the innermost track being denoted as the fiftieth track. The tracks are typically 60 $\mu$m in width with a guard band between adjacent tracks of 40 $\mu$m. When taking a picture, magnetic disk 2 rotates at a speed of 3600 rpm, which determines the field frequency, and a color video signal of one field is then recorded on each track.

Figure 2:
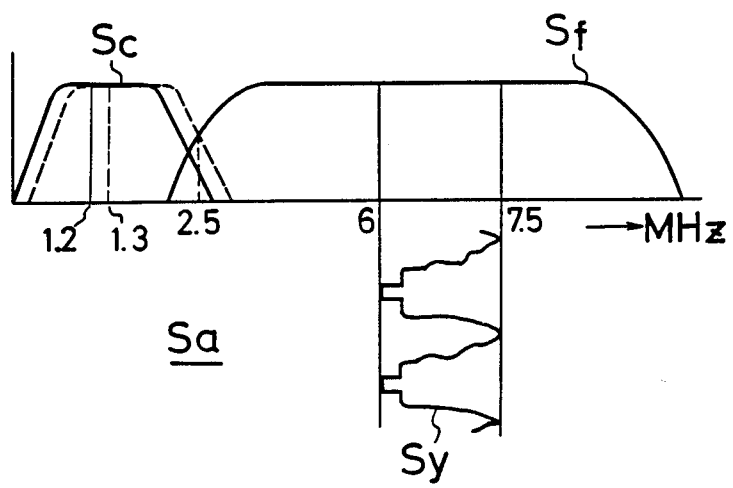
FIG. 2 is a frequency spectrum of a color video signal as might be recorded on the floppy disk of FIG. 1.

The frequency spectrum of a typical color video signal suitable for recording on floppy disk assembly 1 is seen in FIG. 2, in which the luminance component $S_y$ is frequency modulated to a signal $S_f$, wherein the sync level is 6 MHz and the white peak level is 7.5 MHz. The chrominance signal is formed having a line sequential color signal $S_c$ that consists of a frequency modulated carrier having a center frequency of 1.2 MHz, which is modulated by a red color-difference signal, and another frequency modulated signal having a center frequency of 1.3 MHz, which is modulated by a blue color-difference signal. The signal $S_a$ that is then obtained by adding the frequency modulated color signal $S_c$ and the frequency modulated luminance signal $S_y$ is then recorded on magnetic disk 2.

Because the floppy disk assembly 1 shown in FIG. 1 is required to record fifty still color video pictures, a specific data format is required to accomplish this relatively high recording density data. Magnetic disk 2 is pictorially represented in FIG. 3A and one track 2T thereon is shown equally divided into four 90° intervals. Sensing element 4 acts as a fixed reference for determining rotational position of the disk 2. Each of the four intervals is referred as to a block BLCK and the BLCK interval containing rotational sensing member 4 is represented at block 0, with the other blocks being numbered 1, 2, and 3, sequentially.

Figure 3:
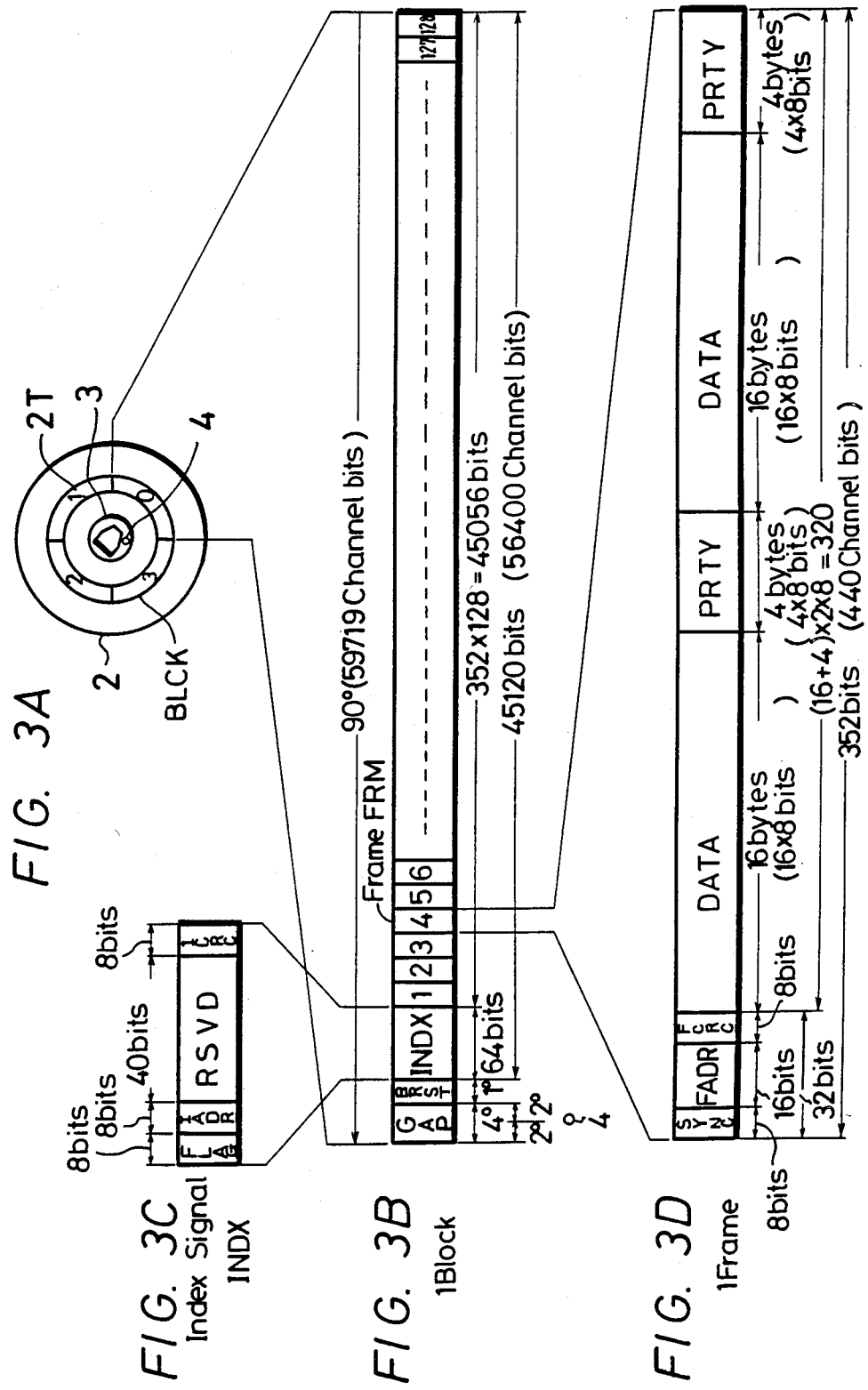
FIGS. 3A–3D are schematic representations of a data format useful in recording information on a floppy disk.

One block BLCK is shown in FIG. 3B in which a 4° interval from the beginning is represented as a gap interval GAP, that affords a margin or spacing upon reading and writing. A succeeding 1° interval is then represented as a burst interval BRST in Block 0, and the center of the interval corresponds to the position of rotational sensing element 4.

The burst interval BRST is provided so that there can be recorded and/or reproduced therein a signal which serves as a preamble signal, a signal indicating the recording density of the recorded signal, and a flag signal indicating that the recorded signal is a digital signal.

Following the burst interval BRST is an interval for an index signal INDX, and the data arrangement therein is shown in FIG. 3C. The index signal INDX consists of a flag signal of 8 bits, an address signal IADR of 8 bits, a 40 bit reserved portion RSVD, and a check signal ICRC of 8 bits. The flag signal FLAG indicates whether the track of interest 2T to which this block belongs is a valid track, whether the track 2T has been erased, and the like. The address signal IADR indicates the number, from 1-50 of track 2T, as well as the number from 0-3 of the block of the particular track. The check signal ICRC is a cyclic redundancy check code for the flag signal FLAG, the address signal IADR, and whatever signal might be arranged within the reserved portion RSVD.

The interval that follows the index interval INDX is divided into 128 equal intervals and is referred to as the frame FRM in which is recorded and/or reproduced data information. The one frame is seen in FIG. 3D as comprising at its beginning a frame synchronizing signal SYNC having 8 bits, a frame address signal FADR of 16 bits, a check signal FCRC of 8 bits, a data signal DATA of 16 bits bytes (in which one byte equals 8 bits), a redundant or parity data PRTY of 4 bytes, another digital data portion DATA of 16 bytes, and a final redundant or parity data PRTY of 4 bytes. In this case, as in the above, the check signal FCRC is also a cyclic redundancy check code for the frame address signal FADR. The data DATA is the original data that should be accessed by a host computer or other peripheral device, and this data is interleaved within a digital data period of one block BLCK. The redundant data PRTY is parity data denoted $C_1$ and $C_2$, which can be generated using the Reed-Solomon coding method having minimum distances of five for digital data of one block (32 bytes × 128 frames).

By employing the data arranged as described hereinabove, the capacities for digital data in one block BLCK, one track 2T, and one disk 2 are then as follows:

one block can contain 4096 bytes (32 bytes × 128 frames);

one track can contain 16 K bytes (4096 bytes × 4 blocks); and one disk can contain 800 K bytes (16 K bytes × 50 tracks).

The number of bits then in one frame FRM and in one block BLCK are as follows:

one frame can contain 352 bits (8+16+8 bits +(16+4 bytes)× 8 bits × 2 frames); and one block which contains only the index interval and frame interval can contain 45120 bits (352 bits × 123 frames).

Nevertheless, in actual practice when the digital signal is recorded and/or reproduced from disk 2 a digital sum variation DSV is required to be small and a ratio between the minimum length between transitions and the maximum length between transition ($T_{min}/T_{max}$) must also be small, whereas the window margin (Tw) must be large. Accordingly, all of the above-described digital signals must be subjected to a 8/10 conversion in which $T_{max}=4T$ prior to recording on magnetic disk 2. As is known upon reproduction, the digital signals then must be reconverted and subjected to subsequent inherent signal processing. In case of the data density described above, an actual number of bits on the disk is multiplied by 10/8 and, thus, one frame is represented as 440 channel bits, and one block as 56400 channel bits.

Thus, the number of bits in one block interval corresponds to 59719 channel bits, which is arrived at by multiplying the channel bits in one block by a 90°/85° fraction. In practice, however, the length of each interval is assigned by the number of the channel bits described above, and the total angle of the frame interval is somewhat less than 85°.

Consequently, the bit rate at which the magnetic disk is accessed by the entire digital signal system is looked at as 14.32 M bits per second, which is approximately 59714 bits × 4 blocks × the field frequency, and one bit corresponds to 69.8 nanoseconds, which is approximately the reciprocal of 14.31 M bits.

According to the format shown in FIGS. 3A-3D, digital data of 800 K bytes can be written on or read from a floppy disk having an approximate 2-inch diameter and this capacity is much more than twice the 320 K bytes capacity of previously known 5.25-inch floppy disks. Accordingly, by employing this format a 2-inch floppy disk has a large capacity in spite of its relatively small size.

Because the floppy disk with this data format can be rotated at the same rate whether the color video signal is being recorded thereon or digital data are being recorded thereon, both signals will have a similar frequency spectrum and can be recorded on the disk with optimum characteristics, such as dictated by the electromagnetic conversion characteristic of the disk and head. Furthermore, even when the two different signals are recorded and/or reproduced on the magnetic disk in a mixed format, because the rotation rate of the disk is not changed there is no time lost in changing over any servo circuit or the like and the two signals can be selectively used immediately. Furthermore, because the disk need only be rotated at a single speed, additional transducers, drive motors, controllers, and the like are not required, which represents economies of manufacture and material.

Figure 4:
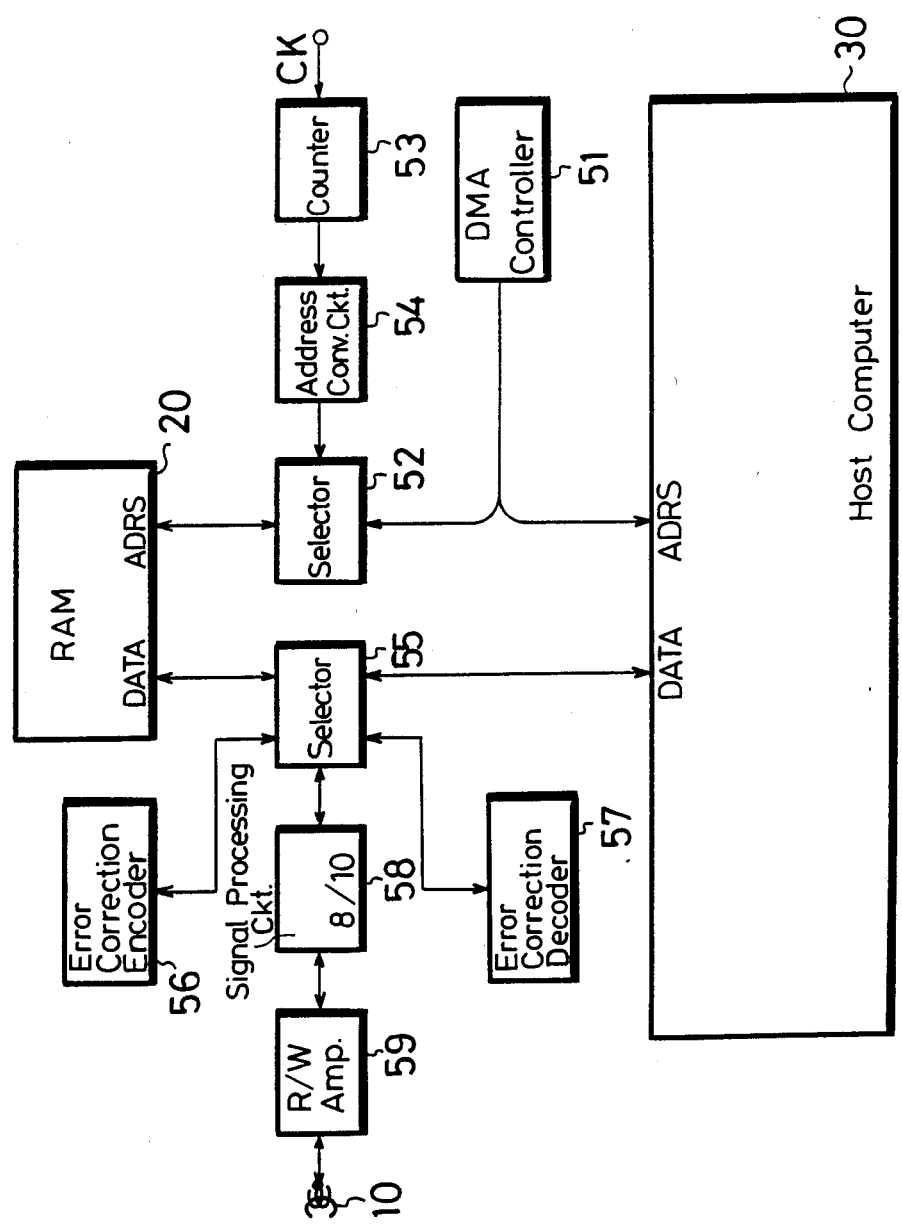
FIG. 4 is a schematic in block diagram form of an embodiment of the present invention.

The present invention then provides a circuit employing a buffer memory that permits a floppy disk having recorded thereon data in the format set forth hereinabove to be advantageously employed without regard to rearranging the time sequence and addresses of such data. In FIG. 4 a system is shown in block diagram form in which digital data may be recorded and/or reproduced from a floppy disk as described above. Magnetic head 10 writes data on a rotary magnetic disk 2 of FIG. 1, as well as reading it therefrom, and a random access memory (RAM) 20 is adapted to serve as a buffer memory. The peripheral device is represented by a host computer 30. Because the data is interleaved within one block BLCK and has added thereto redundant bits for error correction, RAM 20 must have a capacity capable of storing sufficient data to make up at least one block BLCK.

Figure 5:
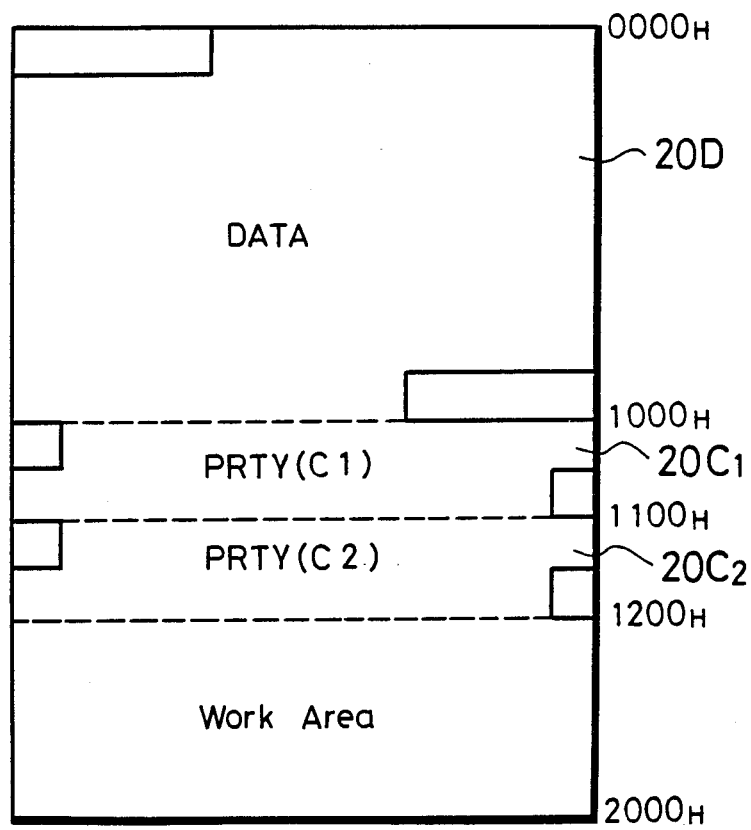
FIG. 5 is a diagrammatic representation useful in explaining a portion of the embodiment of FIG. 4.

FIG. 5 is a diagrammatic representation of the manner in which the memory addresses in RAM 20 are assigned in order to store pure digital data DATA, and as well as parity data $C_1$ and $C_2$ in different respective areas of memory 20.

Referring back to FIG. 4, a direct memory access controller 51 produces consecutive address data delivered to an address bus of host computer 30 that is supplied to address terminal ADRS of RAM 20 through a selector element 52. A counter 53 is connected to receive a clock signal CK and counts the pulses contained within the clock signal to produce consecutive address data, which is supplied to address data converter circuit 54, wherein it is converted to correspond to the interleaved address data. The converted address data is then supplied through selector element 52 to the address terminal ADRS of RAM 20. Another selector element 55 is provided to selectively supply the data DATA to each portion of the system.

An error correcting encoder 56 forms parity data $C_1$ and $C_2$ from the data DATA upon recording and an error correcting decoder 57 performs error correction using such parity data $C_1$ and $C_2$ during reproduction. Signal conversion in the eight-to-ten (8/10) conversion mode is performed by a signal processing circuit 58 that also performs the ten-to-eight (10/8) conversion. Suitable signal levels for recording and playback are achieved by means of recording and playback amplifier 59 connected to magnetic recording head 10.

The operation of the above-described system will be set forth first in regard to the recording mode, in which one block of pure data is fed through the data bus from host computer 30 through selector 55 to the data input terminals DATA of RAM 20. At that time, the consecutive address data from direct memory access controller 51 is fed through selector 52 to the address terminals ADRS of RAM 20. Accordingly, in RAM 20 is stored the pure data with its original time sequence unchanged and, in a successive state, at the consecutive address therein in a data memory area 20D, as represented in FIG. 5. When all of the pure data forming one block has been stored in RAM 20, error correcting encoder 56 then forms parity data $C_2$ from this data and this parity data $C_2$ is then stored in memory area $20C_2$ of RAM 20 in a successive state. In accordance with the converted address data from the address converter circuit 54, the pure data and parity data $C_2$ are then read out from RAM 20 in a corresponding order of the record pattern on the disk, added to parity data $C_1$ in error correction encoder 56, and then fed to signal processor 58. Signal processor 58 performs the 8/10 conversion and converts the parallel data to serial data which is then fed back through the recording and playback amplifier 59 to magnetic head 10, which operates to record the data on track 2T of magnetic disc 2 in the portion corresponding to a 90° interval, for example, in the portion designated as block 0.

After reading one block of data from RAM 20 as described above, a write request signal is fed to host computer 30 and the next succeeding block of pure data is fed from host computer 30 to RAM 20 and then the pure data of one block is added with the parity data $C_1$ and $C_2$, interleaved exactly in the same fashion as described above, and recorded on track 2T of magnetic disk 2 at the portion corresponding to the next successive 90° interval, for example, in block 1. Similarly, after recording data in the four blocks of each track, the data is then recorded on the next successive track.

In this embodiment, it is possible during recording of memory area of RAM 20 that area $20C_1$ for the parity data $C_1$ is not used and then it is possible that after generating, the parity data $C_1$ can be stored only once in this area and then the data DATA and parity data $C_1$ and $C_2$ can be read out from RAM 20 in the order of recorded patterns.

Turning then to the playback mode, when magnetic head 10 traces track 2T, data is extracted from the head 10 upon every one block interval corresponding to 90° and such data is then fed through amplifier 59 to signal processor 58, in which it is converted in the form of 10 bit data to 8 bit data (10/8) and serial data is reconverted to 8-bit parallel data. The parallel data is then fed through selector 55 to RAM 20 and stored therein so that data DATA and parity data $C_1$ and $C_2$ are respectively stored in memory area 20D, $20C_1$, and $20C_2$ in accordance with addresss data corresponding to the interleaving used upon recording. More specifically, the data is stored in RAM 20 such that the data series dispersed by the address data from address data converting circuit 54 will be a consecutive data series. When all the data of one block has been written into RAM 20 in keeping with the address data from address converting data 54, data DATA of RAM 20 are error corrected by use of parity data $C_1$ and $C_2$ in error correcting decoder 57 and are then written back into RAM 20, such that error corrected data DATA is stored in RAM 20.

Thus, once all the data DATA have been stored in RAM 20 in the sequential order or the original time sequence and with the addresses being consecutive, a READY signal is returned to direct memory address controller 51, the data bus is then disconnected from a central processing unit (not shown) of the host computer 30, and the data DATA stored in RAM 20 is transferred in the direct memory access mode to the appropriate peripheral device, under the control of direct memory access controller 51. Once the READY signal is returned to host computer 30, the input/output transfer to the host computer becomes possible.

As described hereinabove according to the present invention not only is a buffer memory provided between the magnetic disk and the peripheral device but also, when the data has been written into the buffer memory or read out therefrom address, conversion is accomplished such that the addresses are allocated so as to be nonsuccessive as seen from the disk but successive as seen from the peripherial instrument. Accordingly, it is not necessary to carry out any address conversion after error correction and the addition of the parity data, the time then required for such conversion can be shortened, and the size of the field memory can be reduced. Moreover, because the addresses can be processed as consecutive addresses by the peripheral device, the system can be matched with a system in which consecutive address data, such as the direct memory access transfer request, is externally generated.

Although illustrative embodiments of the invention have been described in detail herein with reference to the accompanying drawings, it is to be understood that the invention is not limited to such precise embodiments and that various changes and modifications can be effected therein by one skilled in the art without departing from the spirit and scope of the invention, as defined in the appended claims.

What is claimed is:

1. Apparatus for recording and/or reproducing digital data relative to a rotary magnetic disk, in which said digital data is formed as blocks of interleaved data, comprising:
magnetic head means cooperating with said magnetic disk for a transfer of data therebetween;
circuit means for controlling reading and/or writing of digital data between said magnetic disk and said magnetic head means;
buffer storage means connected to said circuit means for storing at least one block of said digital data and;
means for re-arranging said digital data to be written in and read out from said magnetic disk including means for storing said data in said buffer storage means at consecutive addresses in a first predetermined area of said buffer storage means and address converter means for reading said data stored in said buffer storage means in an order corresponding to a record pattern on said magnetic disk, prior to writing said digital data on said rotary magnetic disk by said magnetic head means.

2. Apparatus according to claim 1, wherein said digital data comprises true digital data, and further comprising means receiving said true digital data for producing error correction codes therefrom and combining said error correction codes with said digital data in a predetermined arrangement and said buffer storage means includes means for separately storing said true digital data in said first predetermined area of said buffer storage means and storing said error correction codes in a different, second predetermined area of said buffer storage means.

3. Apparatus according to claim 1, wherein said digital data is obtained from a peripheral device and wherein said means for storing said data at consecutive addresses comprises a direct memory access controller for controlling the addresses of said buffer storage means when transferring said digital data between said buffer storage means and said peripheral device.

4. Apparatus according to claim 3, further comprising error correction encoder means for generating error check data corresponding to said digital data and said error check data is stored in a second predetermined area of said buffer storage means.

5. Apparatus according to claim 4, wherein said error correction encoder means produces two individual error correction codes corresponding to said digital data prior to writing said digital data on said magnetic disc by said magnetic head means and upon reading digital data from said magnetic disk said buffer storage means stores said digital data in said first predetermined area, and said two error correction codes at different second and third respective areas therein.

6. Apparatus for recording and/or reproducing digital data, comprising:
a rotary magnetic disk having digital data recorded thereon in a predetermined record pattern along a record track, said digital data including at least true data and error check data arranged alternately at a predetermined repetition rate along said track;
a magnetic transducer cooperating with said disk for reading in and writing out digital data;
circuit means for controlling the reading and/or writing of digital data on said rotary magnetic disk by said magnetic transducer; and
buffer storage means connected to said circuit means for re-arranging said digital data written in said magnetic disk or read out from said magnetic disk, including means for storing said data in said buffer storage means at consecutive addresses in a first predetermined area of said buffer storage means and address converter means for reading said data stored in said buffer storage means in an order corresponding to a record pattern on said magnetic disk, prior to writing said digital data on said rotary magnetic disk by said magnetic head means, such that said true digital data and said error check data are separately stored at different areas in said buffer storage means.

7. Apparatus according to claim 6, further comprising a peripheral device and wherein said means for storing includes direct memory access controller means for controlling addresses of said buffer storage means upon transferring data between said buffer storage means and said peripheral device.

8. Apparatus according to claim 7, in which said buffer storage means further includes error correction encoding means for generating error check codes derived from said true data transferred from said peripheral device to said buffer storage means, whereby said generated error check codes are stored in said buffer storage means at different areas than said true data.

9. A method of recording and/or reproducing digital data on a rotary magnetic disk using a magnetic head cooperating therewith, comprising the steps of:
storing interleaved digital data in an original time sequence in a random access memory;
forming a first error code relative to said digital data;
storing the first error code in a second predetermined location in said random access memory;
reading out the data and the first error code from said random access memory in the order of a record pattern on the magnetic disk and feeding same to an error encoder for generating and adding thereto a second error code and feeding the digital data and first and second error codes to a signal processor;
converting the data and first and second error codes into an increased bit code;
forming the increased bit code data into a serial signal; and
feeding the serial signal to the magnetic head and recording the serial signal on the disk.

10. A method according to claim 9, further comprising the steps of reproducing data recorded on the magnetic disk and reading same at a rate of one block of data per 90° of disk rotation; from data to a bit format having a fewer number of bits per word and from serial signal to a parallel signal; feeding the parallel converted data to a random access memory and storing the data in one location therein and the error code data in another location therein in accordance with address data corresponding to interleaving used in recording; storing said data in said buffer memory in accordance with addresses produced by an address converter; correcting errors in said data using error code data in an error correction decoder and writing the corrected data back into the buffer memory; and transferring data in a direct memory access mode following storing data of one block in the buffer memory in the original time sequence with all addresses consecutive.

* * * * *